United States Patent
Houston et al.

(10) Patent No.: US 10,523,025 B2
(45) Date of Patent: *Dec. 31, 2019

(54) VOLTAGE CONVERTERS AND METHODS TO USE THEREWITH

(71) Applicant: Intersil Americas LLC, Milpitas, CA (US)

(72) Inventors: Michael Jason Houston, Cary, NC (US); Lei Zhao, Cary, NC (US)

(73) Assignee: Intersil Americas LLC, Milpitas, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 15/688,398

(22) Filed: Aug. 28, 2017

(65) Prior Publication Data

US 2018/0076641 A1 Mar. 15, 2018

Related U.S. Application Data

(63) Continuation of application No. 14/539,699, filed on Nov. 12, 2014, now Pat. No. 9,748,781.
(Continued)

(51) Int. Cl.
*H02J 7/00* (2006.01)
*H02J 3/00* (2006.01)
(Continued)

(52) U.S. Cl.
CPC ............. *H02J 7/0052* (2013.01); *H02J 3/00* (2013.01); *H02M 3/158* (2013.01); *H02M 7/04* (2013.01);
(Continued)

(58) Field of Classification Search
CPC ................................ H02J 7/0052; H02J 1/00
(Continued)

(56) References Cited

U.S. PATENT DOCUMENTS

| 4,891,744 A | 1/1990 | Yamamoto et al. |
| 2012/0080420 A1 | 4/2012 | Hui et al. |

(Continued)

FOREIGN PATENT DOCUMENTS

CN 103513685 A 1/2014

OTHER PUBLICATIONS

Milton Kazmeyer, "Differences Between Feedback Control & Feed Forward Control", Techwalla website. https://www.techwalla.com/articles/differences-between-feedback-control-feed-forward-control, May 22, 2012 (Year: 2012).*

(Continued)

*Primary Examiner* — Adi Amrany
(74) *Attorney, Agent, or Firm* — Foley & Lardner LLP

(57) ABSTRACT

A voltage error signal is provided to a PWM controller of a voltage regular and used to produce a PWM signal that drives a power stage of the regulator. When operating in an adapter current limit regulation mode, an adapter current sense voltage, indicative of an adapter current, is compared to an adapter current reference voltage to produce an adapter current error signal. A compensator receives the adapter current error signal and outputs a compensated adapter current error signal. The adapter current sense voltage, or a high pass filtered version thereof, is subtracted from the compensated adapter current error signal to produce the voltage error signal provided to the PWM controller. Alternatively, an input voltage, or a high pass filtered version thereof, is added to the compensated adapter current error signal to produce the voltage error signal.

12 Claims, 14 Drawing Sheets

Related U.S. Application Data

(60) Provisional application No. 62/016,398, filed on Jun. 24, 2014, provisional application No. 62/045,277, filed on Sep. 3, 2014.

(51) Int. Cl.
  *H02M 3/158* (2006.01)
  *H02M 7/04* (2006.01)
  *H02M 1/14* (2006.01)
  *H02M 1/00* (2006.01)

(52) U.S. Cl.
  CPC ........ *H02J 2007/0059* (2013.01); *H02M 1/14* (2013.01); *H02M 2001/0003* (2013.01); *H02M 2001/007* (2013.01); *Y10T 307/406* (2015.04)

(58) Field of Classification Search
  USPC ............................ 307/31, 112, 116, 125, 139
  See application file for complete search history.

(56) References Cited

U.S. PATENT DOCUMENTS

| | | |
|---|---|---|
| 2012/0249093 A1 | 10/2012 | Grbo et al. |
| 2013/0322139 A1 | 12/2013 | Lee et al. |
| 2014/0032953 A1 | 1/2014 | Wei et al. |

OTHER PUBLICATIONS

Rice University, Types of Control: Open Loop, Feedback, Feedforward. ENGI 128 Lecture notes. https://www.clear.rice.edu/engi128/Handouts/Lec10-Control.pdf Oct. 16, 2013 (Year: 2013).*

Intel, Narrow VDC Extended Battery Life (EBL) Technique, Sep. 2003, 17 pages.

Zhao, L. "Design of a Narrow VDC (NVDC) System Charger Voltage Regulator Using bq24721/30", Application Report SLUA412—Jan. 2007, Texas Instruments, 12 pages.

* cited by examiner

VOLTAGE CONVERTERS AND METHODS TO USE THEREWITH

CROSS-REFERENCE TO RELATED APPLICATIONS

The present application is a continuation of U.S. patent application Ser. No. 14/539,699, filed Nov. 12, 2014, now U.S. Pat. No. 9,748,781. The present application also claims priority to the following patent applications, each of which is incorporated herein by reference in their entirety: U.S. Provisional Patent Application No. 62/016,398, filed Jun. 24, 2014; and U.S. Provisional Patent Application No. 62/045,277, filed Sep. 3, 2014.

DETAILED DESCRIPTION

Embodiments of the present invention, which are described herein, are directed to voltage converters that are configured to limit an adapter current (also known as an input current), and methods for use therewith. An example of such a voltage converter is a narrow voltage direct current (NVDC) battery charger. While certain embodiments described herein are shown as and described as being implemented in an NVDC battery charger, embodiments of the present invention are not limited to use with this type of voltage converter. In other words, embodiments of the present invention can be used with most any voltage converter that operates in an adapter current limit regulation mode.

Figure 1A:
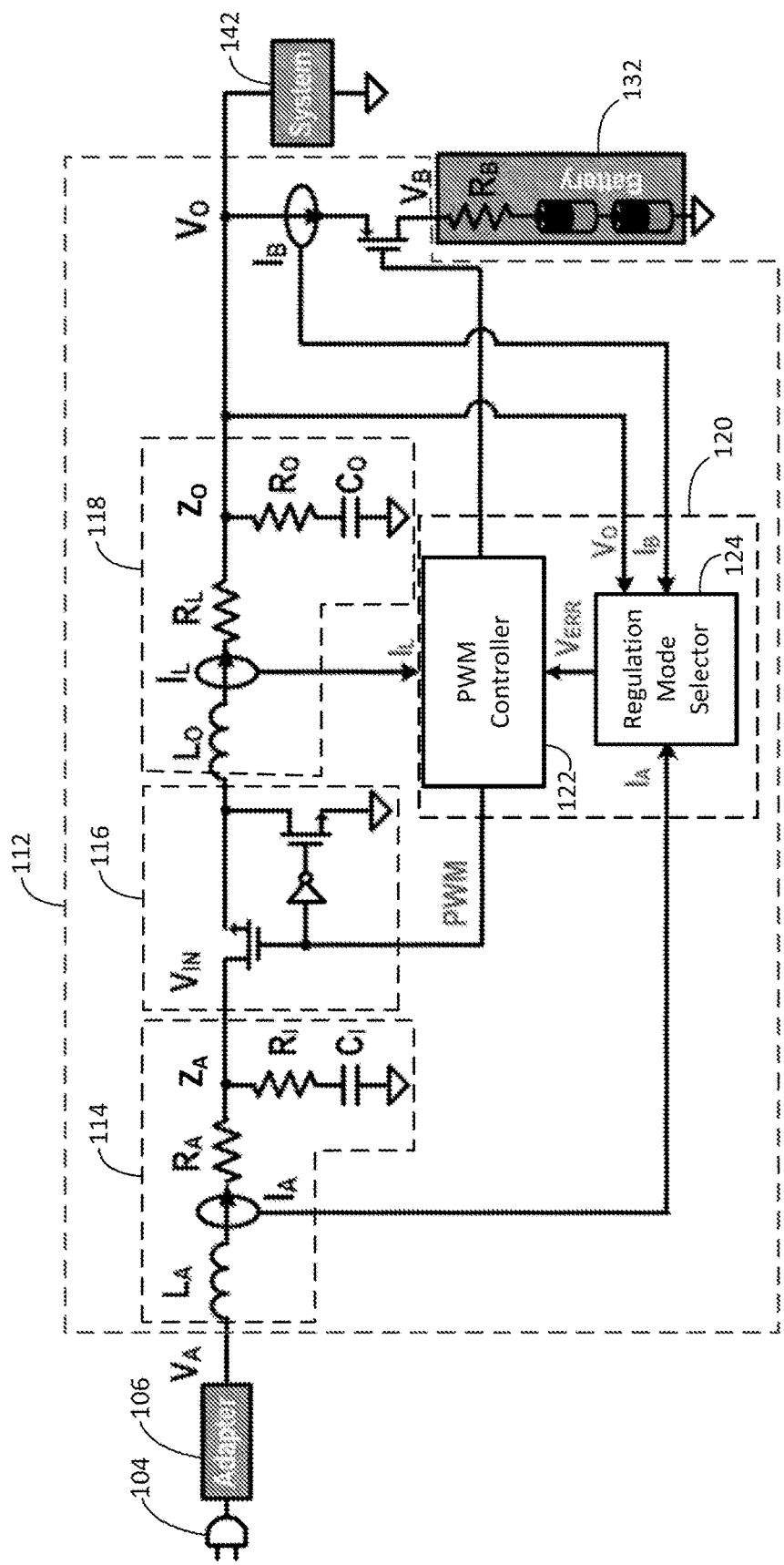
FIGS. 1A and 1B illustrates exemplary components of a narrow voltage direct current (NVDC) battery charger that converts an adapter voltage to an output voltage.

FIG. 1A illustrates exemplary components of an NVDC battery charger 112 that converts an adapter voltage $V_A$, which can also be referred to as the input voltage $V_A$, to an output voltage $V_O$, which can also be referred to as the system voltage $V_O$. The output voltage $V_O$ can be used to power an output load, represented by the system 142, as well as charge one or more rechargeable battery cells, collectively represented as a battery block 132.

Referring to FIG. 1A, the NVDC battery charger 112 is shown as receiving the adapter voltage $V_A$ from an adapter 106 (sometimes referred to as an adapter). The adapter 106 can be or include an AC-to-DC converter that receives an AC voltage from an AC source (represented as an AC plug 104) and converts the AC voltage to the adapter voltage $V_A$, which is a DC voltage. Such an adapter 106 has adapter current limit $I_{A\_MAX}$ that should not be exceeded so as to avoid damaging the adapter 106 and/or circuitry downstream of the adapter 106. The adapter current $I_A$, which is output by the adapter 106, is an example of an input current.

The adapter 106 can, for example, convert 120 VAC to 19 VDC, 14 VDC or 12 VDC, but is not limited thereto. In other words, exemplary values for the adapter voltage $V_A$ are 19 VDC, 14 VDC and 12 VDC, but are not limited thereto. Exemplary values for the output voltage $V_O$ are 4.2 VDC or 8.4 VDC, but are not limited thereto.

The NVDC battery charger 112 is shown as including an input LC filter 114, a power stage 116, an output LC filter 118, and a charger controller 120. The input LC filter 114 is shown as including an inductance or inductor $L_A$, a resistance or resistor $R_A$, a resistor $R_I$, and an input decoupling capacitor $C_I$. The inductance $L_A$ and resistance $R_A$ of the input LC filter 114 can be inductive and resistive characteristics, respectively, of an adapter cable and/or can include discrete inductor and/or resistor elements. In other words, the inductance $L_A$ and the resistance $R_A$ are used to represent a characteristic impedance $Z_A$ of a cable that connects the adapter and the battery charger 112. The output LC filter 118 is shown as including an inductor $L_O$, a resistor $R_L$, a resistor $R_O$ and an output decoupling capacitor $C_O$.

In FIG. 1A the power stage 116 is shown as being a buck power stage (which can also be referred to as a buck voltage regulator) including a pair of NMOS transistors and an inverter. In FIG. 1A, the buck power stage 116 steps down the adapter voltage $V_A$ to the output voltage $V_O$. Alternative buck power stage configurations can be used. It is also possible that the power stage 116 is a boost power stage (which can also be referred to as a boost voltage regulator) that steps up the adapter voltage $V_A$ to the output voltage $V_O$. The power stage can alternatively be a buck-boost power stage (which can also be referred to as a combined buck-boost voltage regulator) that steps down or up the adapter voltage $V_A$ to the output voltage $V_O$. The output voltage $V_O$ can be a voltage rail for components of the system 142. Alternatively, or additionally, the system 142 can include one or more voltage regulator to step down and/or step up the output voltage $V_O$ to generate one or more other voltage rails for components of the system 142.

The charger controller 120 is shown as including a PWM controller 122 and a regulation mode selector 124. As shown in FIG. 1A, the PWM controller 122 receives an inductor current sense signal $I_L$ and a voltage error signal $V_{ERR}$, and in dependence thereon, outputs a pulse width modulation (PWM) signal that is provided to the power stage 116. The PWM controller 122 can operate in voltage-mode control and current-mode control. In voltage-mode control, the regulation mode selector 124 of the charger controller 120 generates a voltage error signal $V_{ERR}$ from the output voltage $V_O$. A compensator (Hc) 162, which can be part of the PWM controller 122 or can be a separate block from the PWM controller 122, compensates the error and provides the resultant voltage control (V control) signal to a PWM signal generator (164 in FIG. 1C). In FIG. 1C, the compensator (Hc) 162 is illustrated as being part of the PWM controller 122. In FIGS. 2, 4, 6, 9 and 11 the compensator (Hc) 162 is illustrates as being a separate block from the PWM controller 122, but as just mentioned, can be part of the PWM controller 122.

Additionally, in voltage-mode control, the PWM signal generator 164 compares the control signal V_control to a fixed ramp to generate the PWM signal that is provided to the power stage 116. In current-mode control, the PWM signal generator 164 compares the control signal V_control to a variable ramp (that is proportional to the inductor current sense signal $I_L$) to generate the PWM signal that is provided to the power stage 116. Current-mode control has certain advantages over voltage-mode control, as will be appreciated from the graphs discussed herein below.

Still referring to FIG. 1A, a PMOS transistor connected between the $V_O$ node and the battery 132, which is used to enable or disable a battery current path, can be controlled by the PWM controller 122, or a further controller (not shown). Alternatively, an NMOS transistor can be used instead of the PMOS transistor.

The regulation mode selector 124 is shown as receiving an adapter current sense signal $I_A$, a battery current sense signal IB, and the output voltage $V_O$. The regulation mode selector 124 is also shown as outputting the voltage error signal $V_{ERR}$ that is provided to the PWM controller 122. The PWM controller 122 uses the voltage error signal $V_{ERR}$ and the inductor current sense signal $I_L$ to adjust a duty cycle of the PWM signal output by the PWM controller 122.

Figure 1B:
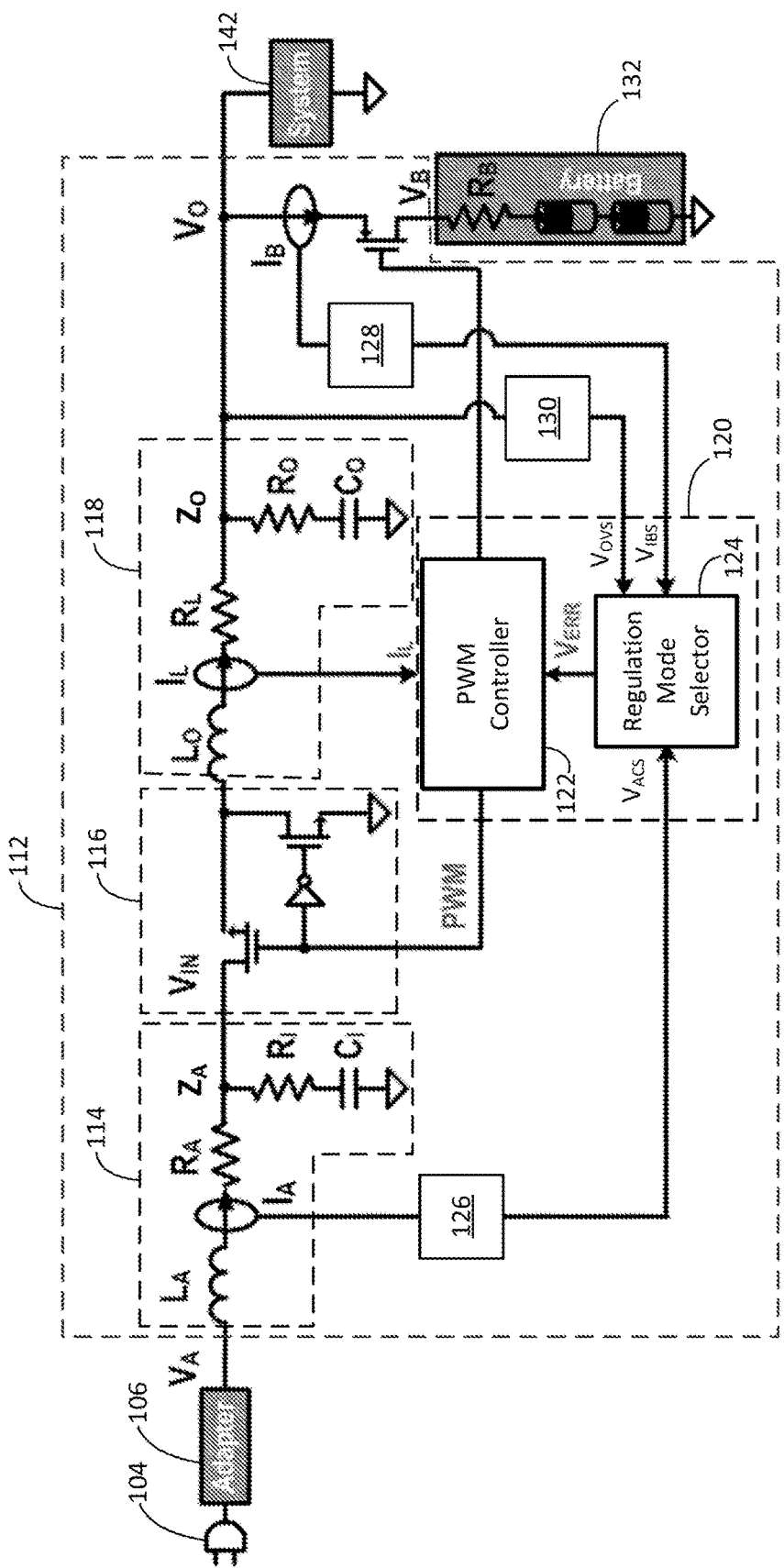
Figure 1C:
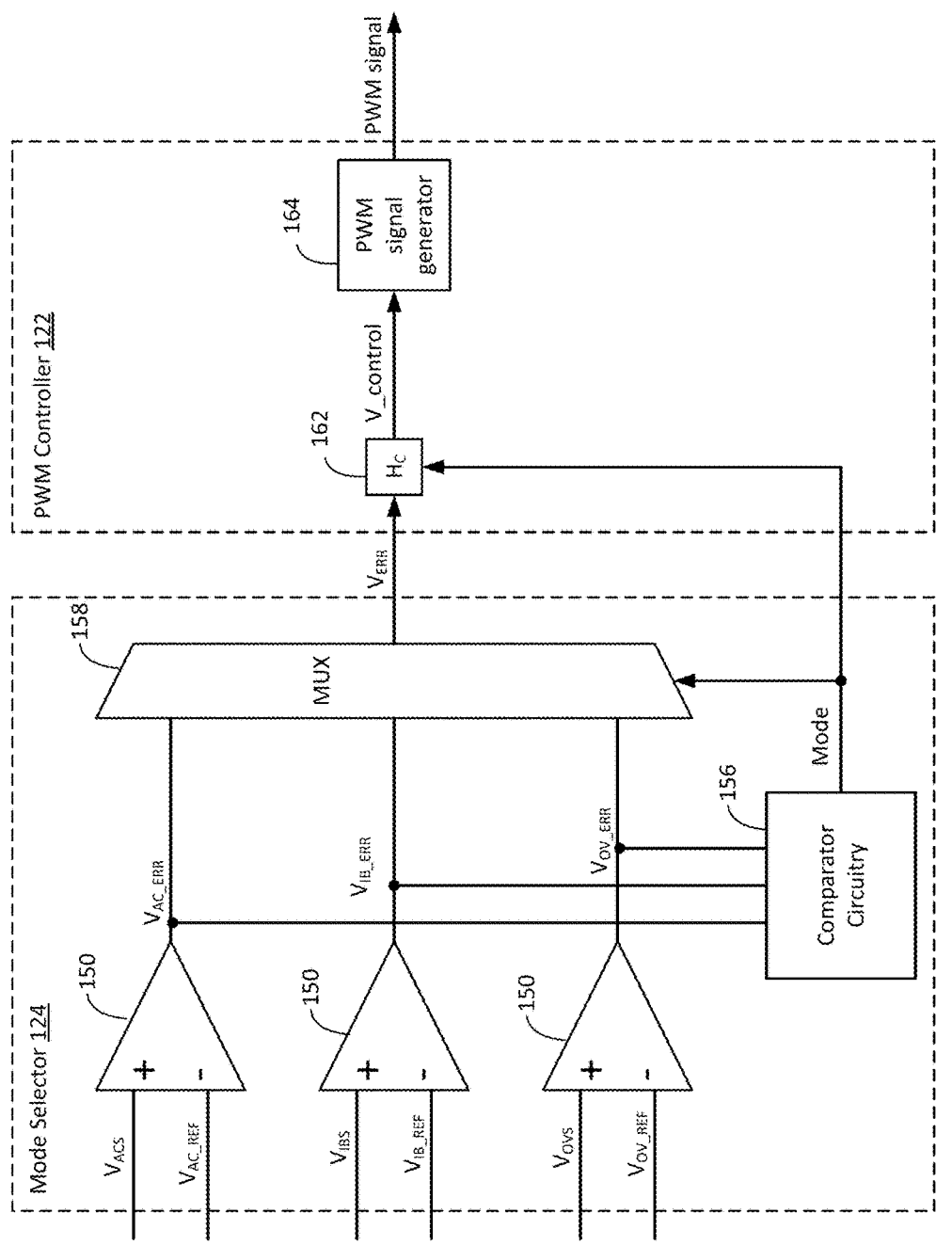
FIG. 1C illustrates exemplary components of the mode selector and PWM controller shown in FIGS. 1A and 1B.

Referring now to FIG. 1B, in accordance with an embodiment, each of the feedback signals provided to the regulation mode selector 124 is a voltage signal indicative of a signal being sensed. For example, a precision resistor and/or other circuitry, represented by block 126, can be used to sense the adapter current $I_A$ and generate an adapter current sense voltage $V_{ACS}$ that is indicative of the sensed adapter current. Alternatively, the adapter current sense voltage $V_{ACS}$ can be obtained by sensing the current across a power MOSFET of the power stage 116, wherein in FIG. 1B the power MOSFET of the power stage is the transistor having its drain-to-source path connected between $R_A$ and $L_A$. A precision resistor and/or other circuitry, represented by block 128, can be used to sense the battery current $I_B$ and generate a battery current sense voltage $V_{BCS}$ that is indicative of the sensed battery current. Additionally, a precision resistor divider and/or other circuitry, represented by block 130, can be used to sense the output voltage $V_O$ and generate an output voltage sense voltage $V_{OVS}$ that is indicative of the sensed output voltage. The adapter current sense voltage $V_{ACS}$, the battery current sense voltage $V_{BCS}$ and the output voltage sense voltage $V_{OVS}$ are all provided to the regulation mode selector 124, which compares each of these sense voltage signals to a respective reference voltage.

In an embodiment, the regulation mode selector 124 compares the adapter current sense voltage $V_{ACS}$ (that is indicative of the sensed adapter current) to an adapter current voltage reference $V_{AC\_REF}$ to thereby generates an adapter current voltage error signal $V_{AC\_ERR}=V_{AC\_REF}-V_{ACS}$. The regulation mode selector 124 also compares the battery current sense voltage $V_{IBS}$ (that is indicative of the sensed battery current) to a battery current voltage reference $V_{IB\_REF}$ to thereby generate a battery current voltage error signal $V_{IB\_ERR}=V_{IB\_REF}-V_{IBS}$. Additionally, the regulation mode selector 124 compares the output voltage sense voltage $V_{OVS}$ (that is indicative of the sensed output voltage) to an output voltage reference $V_{OV\_REF}$ to thereby generate an output voltage error signal $V_{OV\_ERR}=V_{OV\_REF}-V_{OVS}$.

In an embodiment, shown in FIG. 1C, each of the aforementioned comparisons can be implemented using a separate summing amplifier 150, wherein the non-inverting (+) input of the amplifier receives a voltage sense signal (to be compared to the respective reference voltage signal), the inverting (−) input of the amplifier receives the respective reference voltage signal, and the output of the amplifier is the error signal generated by the amplifier. Referring to FIG. 1C, in an embodiment the regulation mode selector 124 also includes a multiplexor (MUX) 158 that receives the three error signal $V_{AC\_ERR}$, $V_{IB\_ERR}$ and $V_{OV\_ERR}$ and outputs the largest one of the error signals as the voltage error signal $V_{ERR}$ that is provided to the PWM controller 122. Accordingly, the regulation mode selector 124 can also include comparators and/or other logic circuitry, shown as comparator circuitry 156 in FIG. 1C, that determines which one of the three error signal $V_{AC\_ERR}$, $V_{IB\_ERR}$ and $V_{OV\_ERR}$ is the greatest. The greatest of the error signals is provided to a compensator 162, which is represented as several separate Hc blocks in the other FIGS. The compensator 162 amplifies the voltage error signal $V_{ERR}$ and adds appropriate poles and zeros to achieve stable regulation. The compensator 162 can be part of the PWM controller 122, as shown in FIG. 1C. Alternatively, the compensator 162 can be considered a separate block from the PWM controller 122.

The NVDC battery charger 112 (which can also be referred to as the charger circuit 112, or simply the charger 112) is configured to operate in three different modes of regulation including: an output voltage regulation mode, a battery current regulation mode, and an adapter current limit regulation mode. The different modes of regulation can also be referred to as different operational modes. When the charger 112 is operating in the output voltage regulation mode the output voltage $V_O$ is regulated, using closed loop feedback, to maintain the output voltage $V_O$ substantially equal to a specified output voltage level. The output voltage reference $V_{ov\_ref}$ is selected to specify the output voltage level at which the output voltage $V_O$ is to be maintained during the output voltage regulation mode. When the charger 112 is operating in the adapter current limit regulation mode the adapter current $I_A$ is regulated to maintain the adapter current $I_A$ substantially equal to a specified adapter current level, and more generally, to prevent the adapter current $I_A$ from exceeding a predetermined maximum adapter current. The adapter current voltage reference $V_{AC\_REF}$ is selected to specify the adapter current level at which the adapter current $I_A$ is to be maintained during the output voltage regulation mode. When the charger 112 is operating in the battery current regulation mode, which can also be referred to as a battery current limit regulation mode, the battery current $I_B$ is being regulated to maintain the battery current $I_B$ substantially equal to a specified battery current level, and more generally, to prevent the battery current $I_B$ from exceeding a predetermined maximum battery current. The battery current voltage reference $V_{IB\_REF}$ is selected to specify the battery current level at which the battery current $I_B$ is to be maintained during the battery current regulation mode. Each of the aforementioned specified level can be predetermined, e.g., for a specific combination of the adapter 106, system 142 and battery 132. These three regulation modes should not be confused with the aforementioned current-mode control and the voltage-mode control (which are modes in which the PWM controller 122 can operate, as explained above).

Referring again to FIG. 1B, there are two LC double poles in the charger circuit 112, which are represented by the labels $Z_O$ and $Z_A$. More specifically, when the PWM controller 122 operates in voltage-mode control, $L_A$ and $C_I$ of the input LC filter 114 cause a complex double pole represented by $Z_A$, and $L_O$ and $C_O$ of the output LC filter 118 cause a complex double pole represented by $Z_O$. The double pole represented by $Z_A$ has a damping factor caused by $R_A$ and $R_I$ of the input LC filter 114, and the double pole represented by $Z_O$ has a damping factor caused by $R_L$ and $R_O$ for the output LC filter 118.

Figure 2:
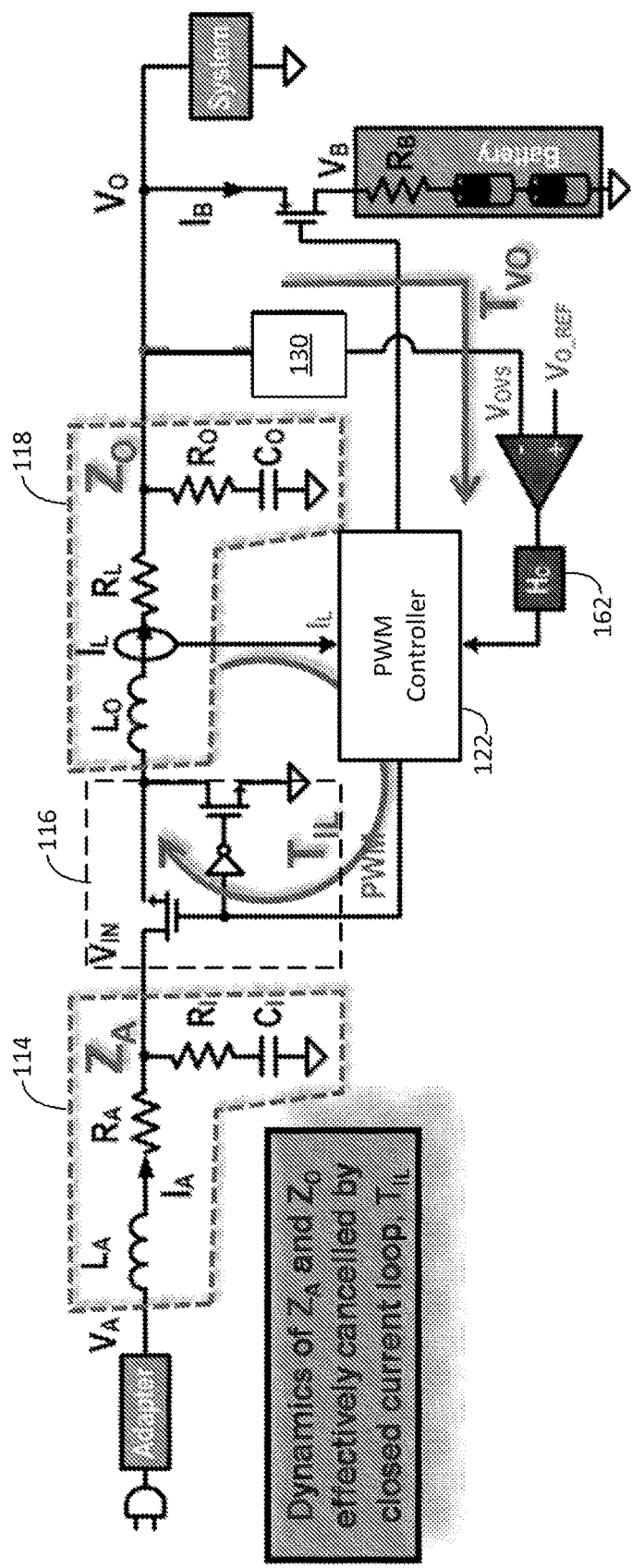
FIG. 2 illustrates two feedback loops that operate when the NVDC battery charger introduced in FIGS. 1A and 1B operates with current-mode control in the output voltage regulation mode.
Figures 3A, 3B:
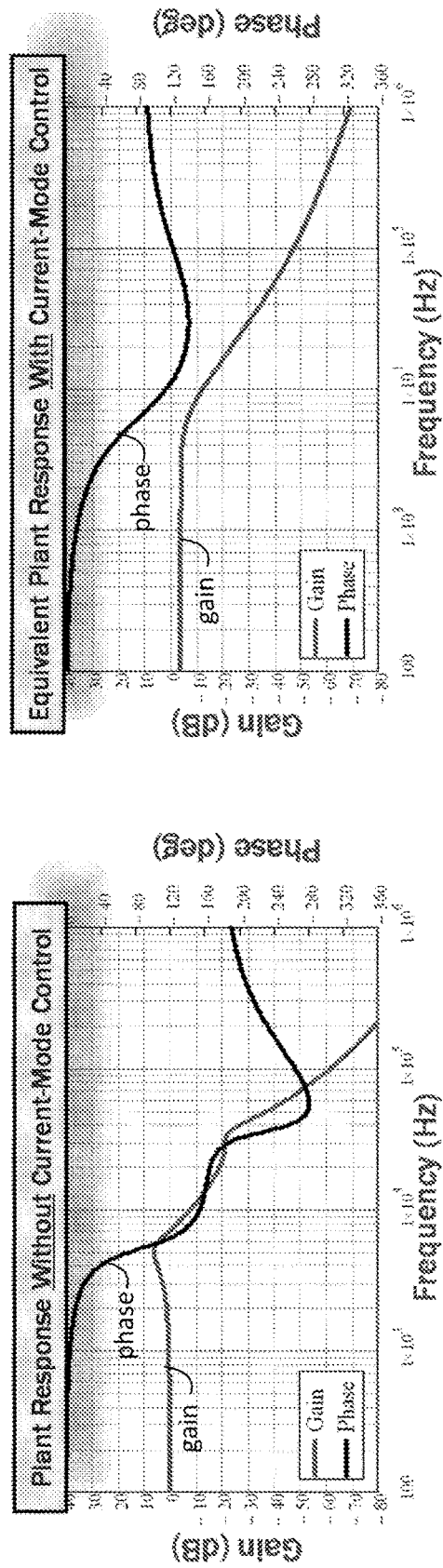
FIG. 3A is a Bode plot that illustrates a plant response, between VA and VO in FIG. 2, without current-mode control (i.e. using voltage-mode control).
FIG. 3B is a Bode plot that illustrates the plant response, between VA and VO in FIG. 2, with current-mode control.
Figure 4:
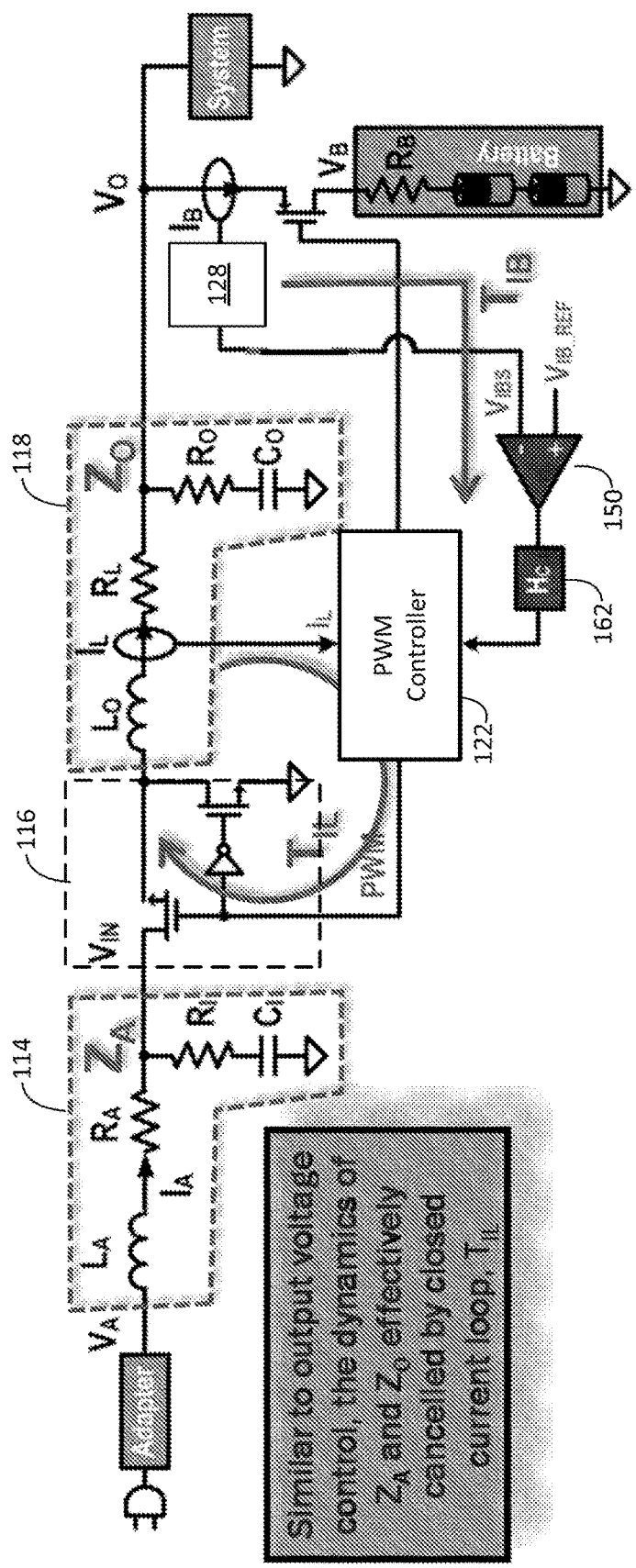
FIG. 4 is used to illustrate that there are two feedback loops that operate when the NVDC battery charger operates in the battery current regulation mode.
Figure 5B:
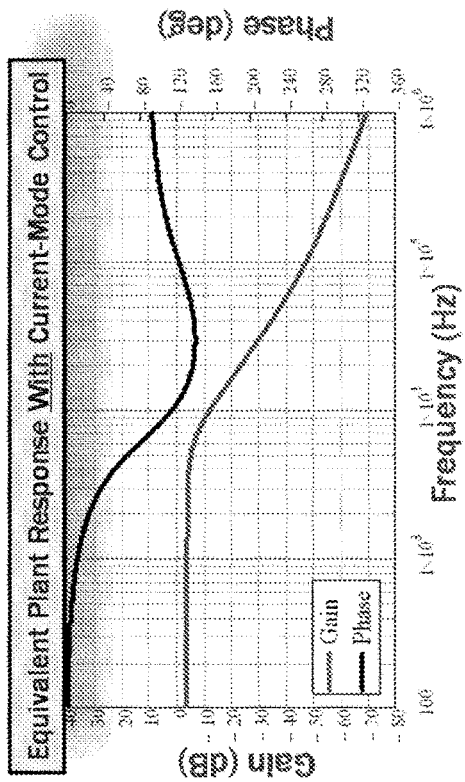
FIG. 5B is a Bode plot that illustrates the plant response, between VA and VO in FIG. 4, with current-mode control.
Figure 5A:
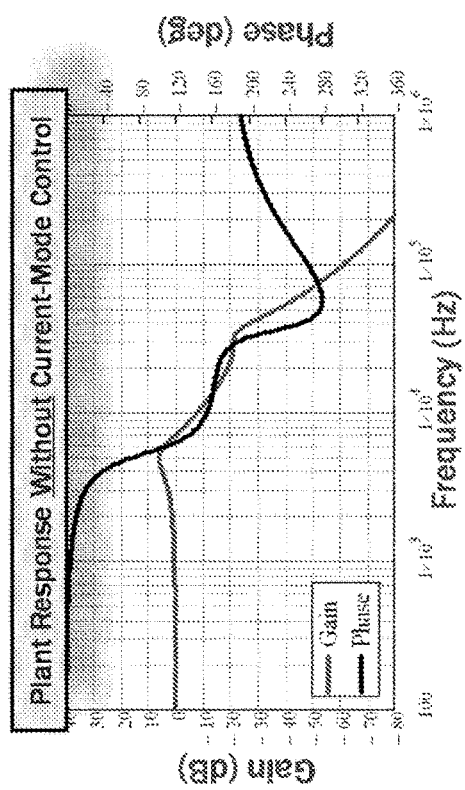
FIG. 5A is a Bode plot that illustrates a plant response, between VA and VO in FIG. 4, without current-mode control.
Figure 6:
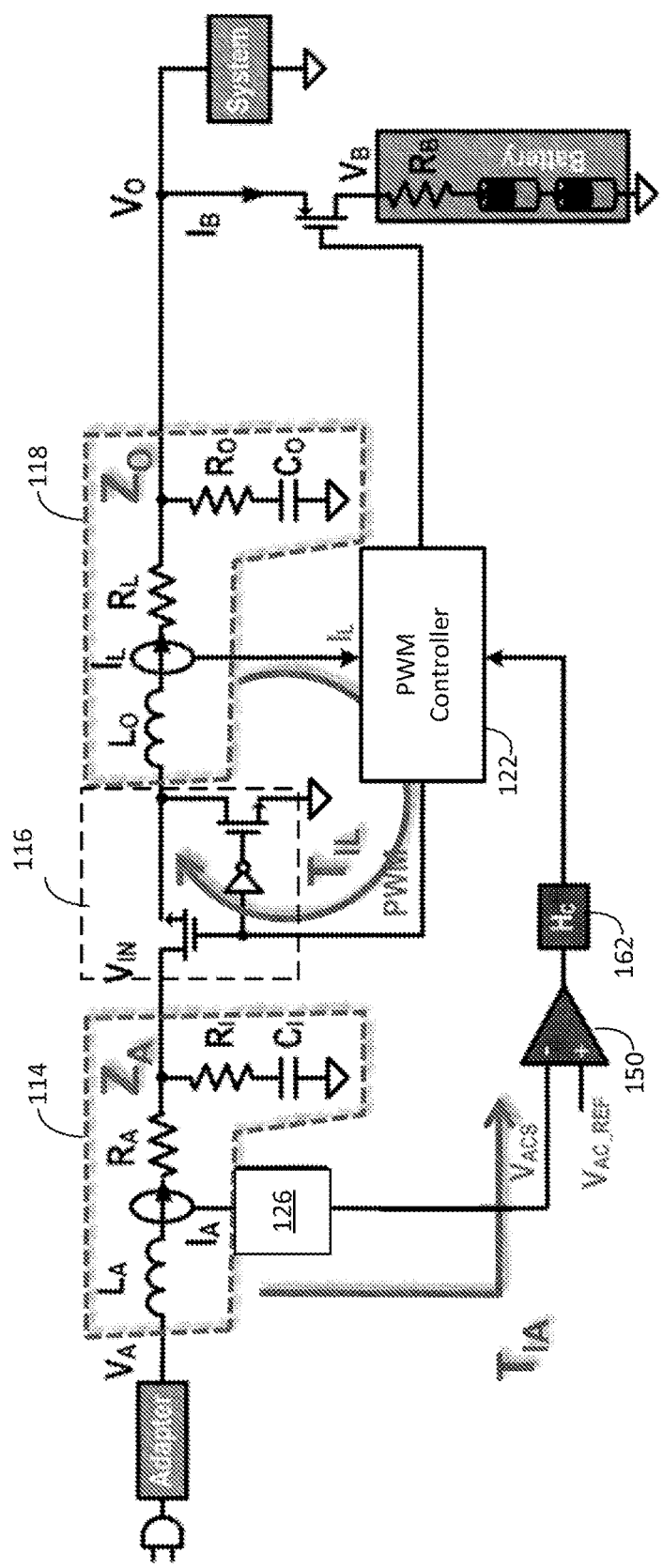
FIG. 6 is used to illustrate that there are two feedback loops that operate when the NVDC battery charger operates in the adapter current limit regulation mode.
Figures 7A, 7B:
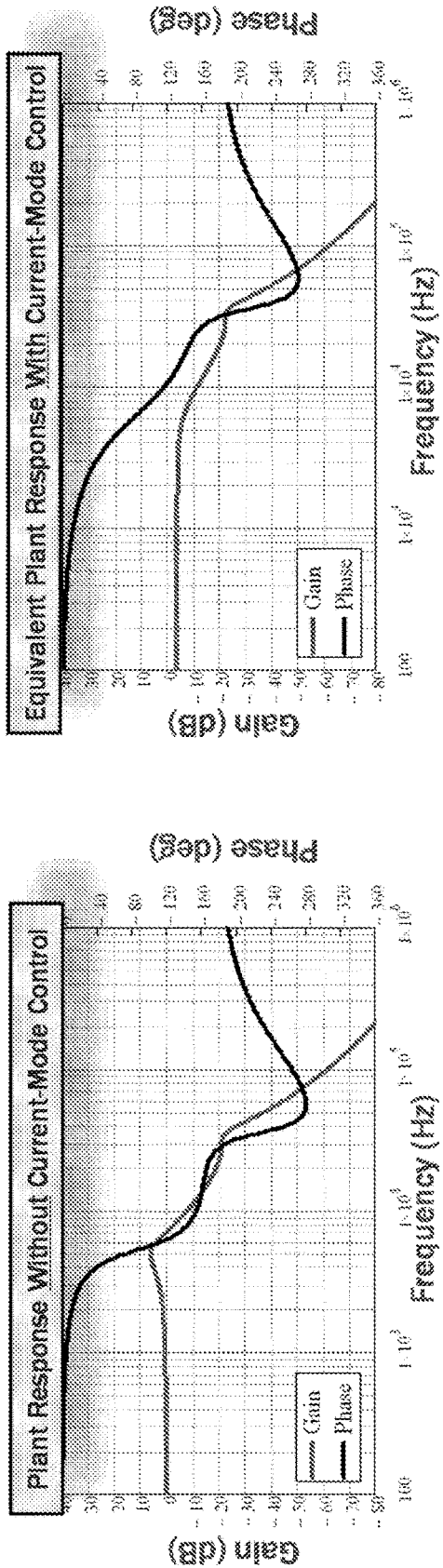
FIG. 7A is a Bode plot that illustrates a plant response, between VA and VO in FIG. 6, without current-mode control.
FIG. 7B is a Bode plot that illustrates the plant response, between VA and VO in FIG. 6, with current-mode control.

FIGS. 2, 3A and 3B will be used to explain how the charger circuit 112 operates during voltage output regulation mode. FIGS. 4, 5A and 5B will be used to explain how the charger circuit 112 operates during battery current regulation mode. FIGS. 6, 7A and 7B will be used to explain how the charger circuit 112 operates during adapter current limit regulation mode.

Referring now to FIG. 2, illustrated therein are two loops that operate when the charger circuit 112 is operating with current-mode control in the output voltage regulation mode. One loop, which is labeled $T_{IL}$, is an inner current mode feedback loop. The other loop, which is labeled $T_{VO}$, is a feed forward loop that regulates the output voltage $V_O$. The inner current feedback loop $T_{IL}$ substantially nulls or cancels out the complex double poles represented by $Z_O$ and $Z_A$. The Bode plot in FIG. 3A illustrates the plant response, between $V_A$ and $V_O$ in FIG. 2, without current-mode control (i.e. using voltage-mode control). The Bode plot in FIG. 3B illustrates the plant response, between $V_A$ and $V_O$, with current-mode control. As can be appreciated from a comparison between FIGS. 3A and 3B, using current-mode control significantly reduces the undesirable peaking in the gain curve, and significantly reduces the degree of phase change over the frequency spectrum. Accordingly, use of current-mode control when operating in output voltage regulation mode simplifies compensation of the power stage 116 performed by the compensator Hc.

FIG. 4 is used to illustrate that there are two loops that operate when the charger circuit 112 is operating in the battery current regulation mode. One loop, which is labeled $T_{IL}$, is an inner current mode feedback loop. The other loop, which is labeled $T_{IB}$, is a feed forward loop that regulates the battery current $I_B$. The inner current feedback loop $T_{IL}$ substantially nulls or cancels out the complex double poles represented by $Z_O$ and $Z_A$. The Bode plot in FIG. 5A illustrates the plant response, between $V_A$ and $V_O$ in FIG. 4, without current-mode control. The Bode plot in FIG. 5B illustrates the plant response, between $V_A$ and $V_O$, with current-mode control. As can be appreciated from a comparison between FIGS. 5A and 5B is that during battery current regulation mode, using current-mode control significantly reduces the undesirable peaking in the gain curve, and significantly reduces the degree of phase change over the frequency spectrum. Accordingly, use of current-mode control when operating in the battery current regulation mode simplifies compensation of the power stage 116 performed by the compensator Hc.

Figure 8B:
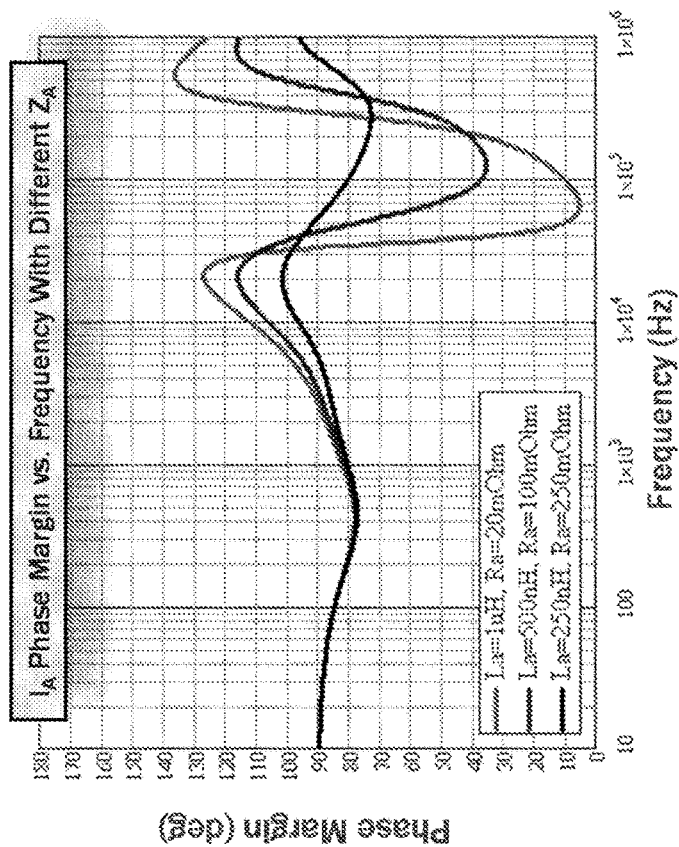
FIGS. 8A and 8B are graphs that illustrate that an adapter current feedback loop TIA is sensitive to a complex double pole.
Figure 8A:
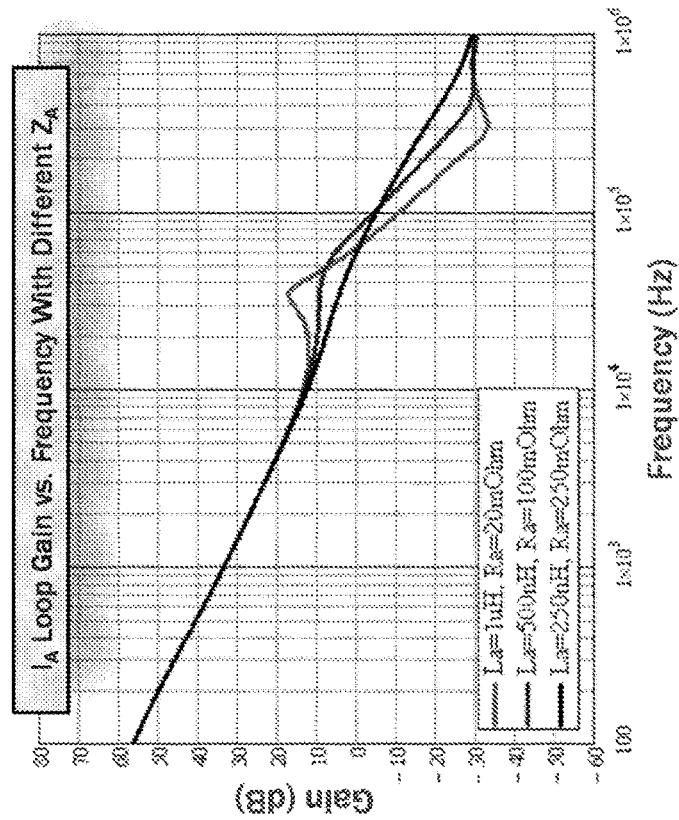

FIG. 6 is used to illustrate that there are two loops that operate when the charger circuit 112 is operating in the adapter current limit regulation mode. One loop, which is labeled $T_{IL}$, is an inner current mode feedback loop. The other loop, which is labeled $T_{IA}$, is a feed forward loop, which can also be referred to as an adapter current feed forward loop that regulates the adapter current $I_A$. The inner current feedback loop $T_{IL}$ substantially nulls or cancels out the complex double poles represented by $Z_O$ and $Z_A$. However, the adapter current feed forward loop $T_{IA}$ feeds the $Z_A$ complex double pole forward into the system, which prevents use of the current-mode control from significantly reducing the undesirable peaking in the gain curve and from significantly reducing the degree of phase change over the frequency spectrum due to $Z_A$, as can be appreciated from the Bode plots in FIGS. 7A and 7B. The graphs in FIGS. 8A and 8B illustrate that the adapter current feed forward loop $T_{IA}$ is sensitive to the complex double pole represented by $Z_A$, where $Z_A = Z_{CI}/(Z_{CI} + Z_{LA})$. This makes the regulator difficult to stabilize. More specifically, this make the compensator Hc difficult to design.

Figure 9:
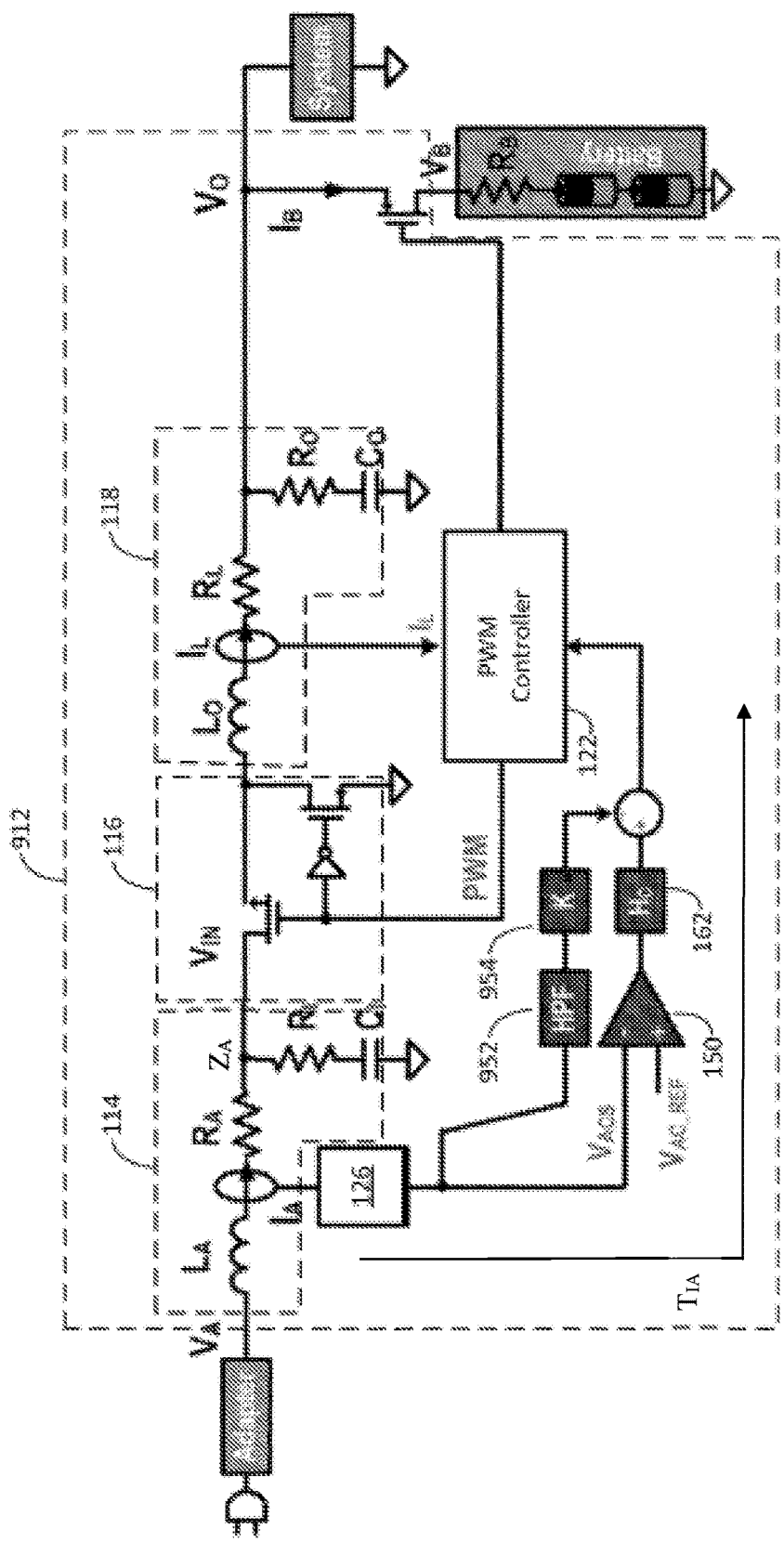
FIG. 9 illustrates an NVDC battery charger, according to an embodiment of the present invention, while it is operating in adapter current limit regulation mode.
Figures 10A, 10B:
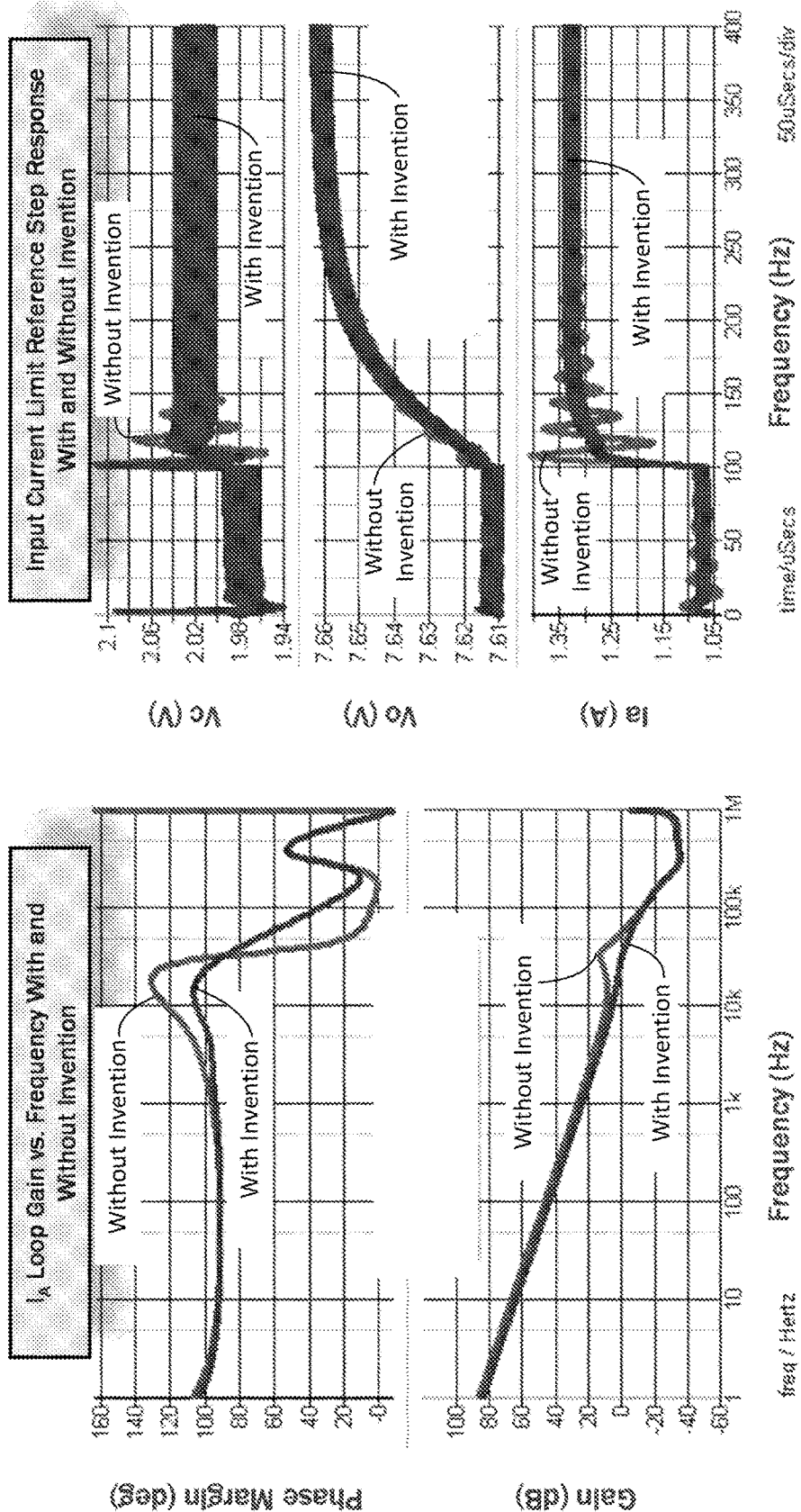
FIGS. 10A and 10B are graphs that illustrate the improvement that can be achieved using the embodiment described with reference to FIG. 9.

FIG. 9 illustrates an NVDC battery charger 912, according to an embodiment of the present invention, while it is operating in adapter current limit regulation mode. The NVDC battery charger 912 includes the components of the NVDC battery charger 112 introduced in FIG. 1A, which are labeled the same and operate in the same manner as discussed above. A comparison between FIG. 6 and FIG. 9 reveals that NVDC battery charger 912 in FIG. 9 also includes a high pass filter (HPF) 952 and a gain factor (K) 954. In FIG. 9, the adapter current sense voltage $V_{ACS}$, that is indicative of the sensed adapter current, is high pass filtered by the HPF 952, so that DC operating conditions remain unchanged. The gain factor (K) 954 is applied to the output of the HPF 952, and the resulting signal is subtracted from the signal output by the compensator Hc, which can be referred to as a compensated error signal. The resultant signal is provided to the PWM controller 122. In this embodiment, the adapter current feedback loop provides a controllable damping factor that splits the complex double pole represented by $Z_A$ to improve dynamic performance and make compensation easier, and thus the compensator Hc easier to design. The graphs in FIGS. 10A and 10B illustrate the improvement that can be achieved using the embodiment described with reference to FIG. 9.

In an alternative embodiment, the adapter current sense voltage $V_{ACS}$, that is indicative of the sensed adapter current, is subtracted from the signal output by the compensator Hc (which can be referred to as the compensated error signal) to produce the resultant signal that is provided to the PWM controller 122. In other words, in the alternative embodiment inclusion and use of the HPF 952 and the gain factor (K) 954 are eliminated. This alternative embodiment also uses an adapter current feedback loop to provide a controllable damping factor that splits the complex double pole represented by $Z_A$ to improve dynamic performance and make compensation easier, and thus the compensator Hc easier to design. However, a benefit of utilizing the HPF 952 is that it enables the PWM controller 122 to operate without changing its DC operating condition.

Figure 11:
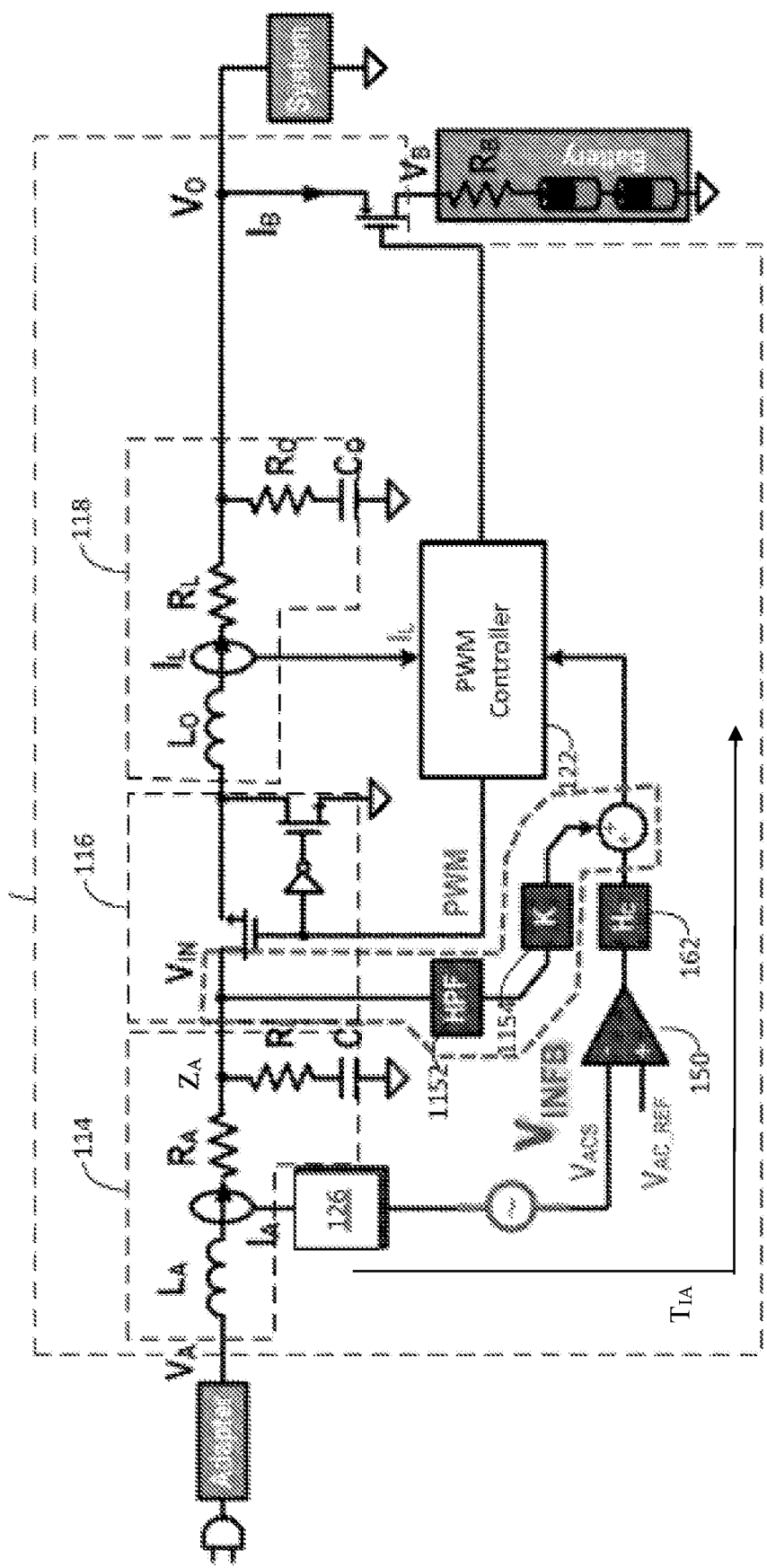
FIG. 11 illustrates an NVDC battery charger, according to an embodiment of the present invention, while it is operating in adapter current limit regulation mode.
Figures 12A, 12B:
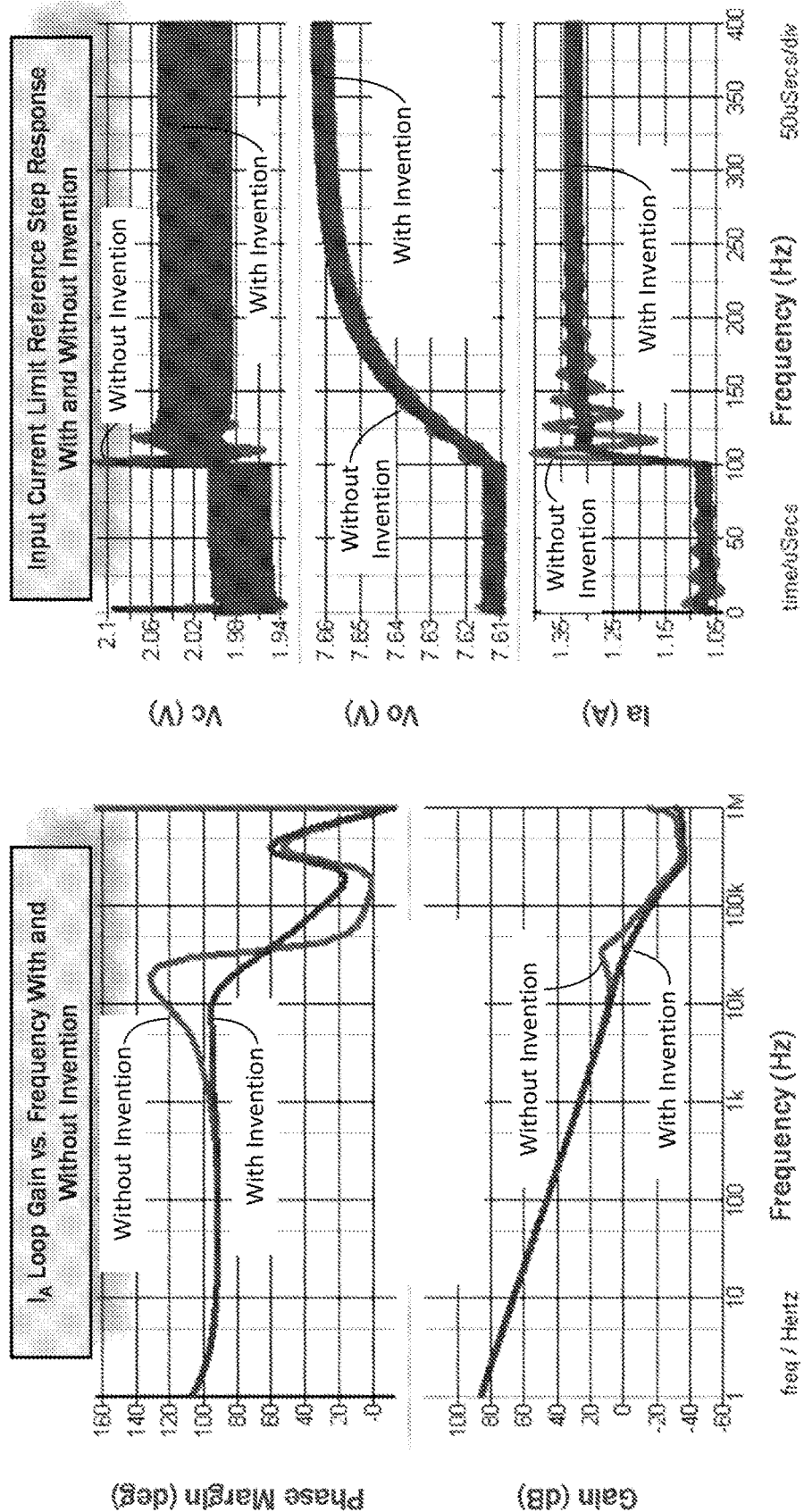
FIGS. 12A and 12B are graphs that illustrate the improvement that can be achieved using the embodiment described with reference to FIG. 11.

FIG. 11 illustrates an NVDC battery charger 1112, according to an embodiment of the present invention, while it is operating in adapter current limit regulation mode. The NVDC battery charger 1112 includes the components of the NVDC battery charger 112 introduced in FIG. 1A, which are labeled the same and operate in the same manner as discussed above. A comparison between FIG. 6 and FIG. 11 reveals that NVDC battery charger 1112 in FIG. 11 also includes a high pass filter (HPF) 1152 and a gain factor (K) 1154. In FIG. 11, a sensed input voltage VIN is high pass filtered by the HPF 1152, so that DC operating conditions remain unchanged. The gain factor (K) 1154 is applied to the output of the HPF 1152, and the resulting signal is added to the signal output by the compensator Hc, which can be referred to as a compensated error signal. The resultant signal is provided to the PWM controller 122. In this embodiment, the adapter current feedback loop provides a controllable damping factor that splits the complex double pole represented by $Z_A$ to improve dynamic performance and make compensation easier, and thus the compensator Hc easier to design. The graphs in FIGS. 12A and 12B illustrate the improvement that can be achieved using the embodiment described with reference to FIG. 11.

In an alternative embodiment, the sensed input voltage VIN is added to the signal output by the compensator Hc (which can be referred to as a compensated error signal) to produce the resultant signal that is provided to the PWM controller 122. In other words, in the alternative embodiment the inclusion and use of the HPF 1152 and the gain factor (K) 954 are eliminated. This alternative embodiment also uses the adapter current feedback loop to provide a controllable damping factor that splits the complex double pole represented by $Z_A$ to improve dynamic performance and make compensation easier, and thus the compensator Hc easier to design. However, a benefit of utilizing the HPF 1152 is that it enables the PWM controller 122 to operate without changing its DC operating condition.

In the above description, the charger controller 120 was generally shown and described as being implemented using analog circuitry that operates on analog signals in the analog domain. This includes the regulation mode selector 124 and PWM controller 122 being implemented using analog circuitry. Alternatively, the charger controller 120 can be implemented using digital circuitry that operates on digital signals in the digital domain. This includes the regulation mode selector 124 and PWM controller 122 being implemented using digital circuitry. In such digital implementations, the blocks 126, 128 and 130 can include AC-to-DC converters that convert that $V_{ACS}$, $V_{IBS}$ and $V_{OVS}$ signals from analog to digital signals.

Embodiments of the present invention are also directed to related methods for performing voltage regulation.

Many embodiments that were described above and shown in the FIGS., were described and shown as being implemented as NVDC battery chargers that are configured to limit an adapter current (also known as an input current), and methods for user therewith. However, embodiments of the present invention are not intended to be limited NVDC battery chargers. Rather, embodiments of the present invention are more broadly directed to voltage converters that are configured to limit an adapter current (also known as an input current), and methods for user therewith. In other words, embodiments of the present invention can be used with most any voltage converter that operates in an adapter current limit regulation mode.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The breadth and scope of the present invention should not be limited by any of the above-described exemplary embodiments, but should be defined only in accordance with the following claims and their equivalents.

What is claimed is:

1. A voltage regulator for converting an input voltage from an adapter to an output voltage, comprising:
   a PWM controller that generates a PWM signal for driving a power stage in accordance with an error signal; and
   a feed forward loop including:
      a comparator that compares an adapter current sense voltage, which is indicative of an adapter current, to an adapter current reference voltage to produce an adapter current error signal,
      a compensator that receives the adapter current error signal and outputs a compensated adapter current error signal, and
      a subtractor that subtracts the adapter current sense voltage, or a high pass filtered version thereof, from the compensated adapter current error signal to produce the error signal that is provided to the PWM controller.

2. The voltage regulator of claim 1, further comprising a high pass filter and a gain factor that produces the high pass filtered version of the adapter current sense voltage.

3. The voltage regulator of claim 1, further comprising:
   an input LC filter that receives an adapter voltage from the adapter and in dependence thereon produces the input voltage;
   an output LC filter that is coupled to an output of the power stage and outputs the output voltage for use in at least one of powering a load or charging a battery; and
   an inner current feedback loop that substantially nulls out both a first complex double pole caused by the input LC filter and a second complex double pole caused by the output LC filter; and
   wherein the feed forward loop regulates the adapter current and feeds forward the first complex double pole caused by the input LC filter, and
   wherein the subtracting out of the adapter current sense voltage, or the high pass filtered version thereof, from the compensated adapter current error signal splits the complex double pole fed forward by the feed forward loop.

4. The voltage regulator of claim 3, wherein the splitting of the first complex double pole improves dynamic performance of the voltage regulator and simplifies compensation performed by the compensator, compared to if the first complex double pole were not split.

5. The voltage regulator of claim 1, wherein the voltage regulator comprises a narrow voltage direct current (NVDC) battery charger.

6. The voltage regulator of claim 1, wherein the power stage is one of a buck power stage, a boost power stage and a buck-boost power stage.

7. A voltage regulator for converting an input voltage from an adapter to an output voltage, comprising:
   a PWM controller that generates a PWM signal for driving a power stage in accordance with an error signal; and
   a feed forward loop, including:
      a comparator that compares an adapter current sense voltage, which is indicative of an adapter current, to an adapter current reference voltage to produce an adapter current error signal, a compensator that receives the adapter current error signal and outputs a compensated adapter current error signal, and an adder that adds a signal representative of the input voltage, or a high pass filtered version thereof, to the compensated adapter current error signal to produce the error signal that is provided to the PWM controller.

8. The voltage regulator of claim 7, further comprising a high pass filter and a gain factor that produces the high pass filtered version of the input voltage.

9. The voltage regulator of claim 7, further comprising:

an input LC filter that receives an adapter voltage from the adapter and in dependence thereon produces the input voltage;

an output LC filter that is coupled to an output of the power stage and outputs the output voltage for use in at least one of powering a load or charging a battery;

an inner current feedback loop that substantially nulls out both a first complex double pole caused by the input LC filter and a second complex double pole caused by the output LC filter; and wherein the feed forward loop regulates the adapter current and feeds forward the first complex double pole caused by the input LC filter, and wherein the adding of the input voltage, or the high pass filtered version thereof, to the compensated adapter current error signal splits the complex double pole fed forward by the feed forward loop.

10. The voltage regulator of claim 9, wherein the splitting of the first complex double pole improves dynamic performance of the voltage regulator and simplifies compensation performed by the compensator, compared to if the first complex double pole were not split.

11. The voltage regulator of claim 7, wherein the voltage regulator comprises a narrow voltage direct current (NVDC) battery charger.

12. The voltage regulator of claim 7, wherein the power stage is one of a buck power stage, a boost power stage and a buck-boost power stage.

* * * * *